(No Model.)
J. & J. F. MADDOCK.
MOLD FOR THE MANUFACTURE OF POTTERY WARE.
No. 308,970. Patented Dec. 9, 1884.
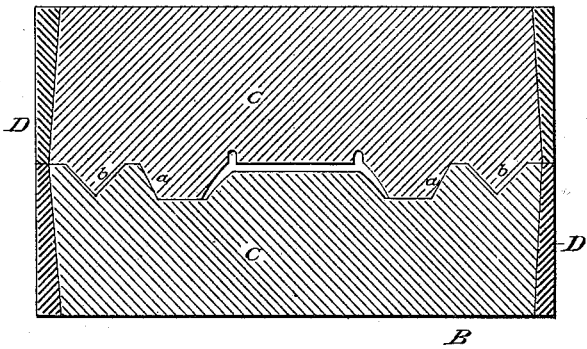
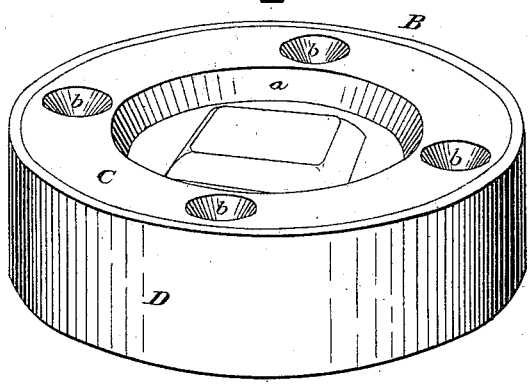
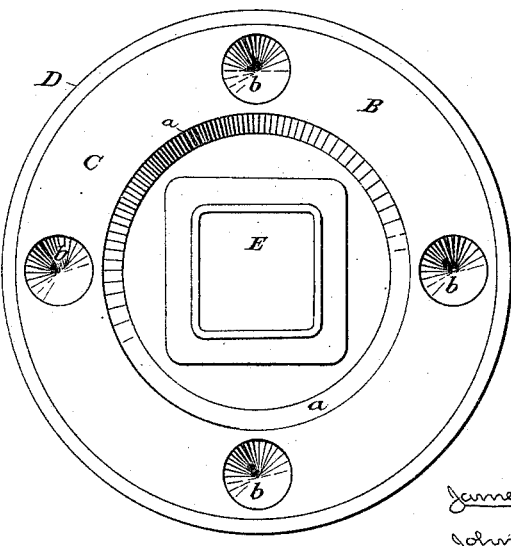
WITNESSES:
E. B. Bolton
Geo. Bainton
INVENTORS:
James Maddock and
John F. Maddock
By their Attorneys,
Burke Fraser Bennett

UNITED STATES PATENT OFFICE.

JAMES MADDOCK AND JOHN FRANCIS MADDOCK, OF BURSLEM, COUNTY OF STAFFORD, ENGLAND, ASSIGNORS TO HENRY MADDOCK, OF BROOKLYN, NEW YORK.

MOLD FOR THE MANUFACTURE OF POTTERY-WARE.

SPECIFICATION forming part of Letters Patent No. 308,970, dated December 9, 1884.

Application filed July 31, 1884. (No model.) Patented in England March 26, 1884, No. 5,460.

*To all whom it may concern:*

Be it known that we, JAMES MADDOCK and JOHN FRANCIS MADDOCK, both British subjects, residing at Burslem, Staffordshire, England, have invented certain new and useful Improvements in Molds for the Manufacture of Pottery-Ware, of which the following is a specification.

This invention relates to the molds used by potters for shaping the clay to form certain kinds of dishes. Plaster-of-paris molds are commonly used for this purpose, and the clay confined between the two molds is shaped by forcing the molds together with a slight pressure. The object of this invention is to produce molds of this character which shall be strong enough to enable a heavy pressure to be used, which would break the ordinary molds now employed.

Figure 1 of the accompanying drawings is a vertical mid-section of a pair of molds made according to our invention. Fig. 2 is a perspective view, and Fig. 3 is a plan, of the lower mold, the upper one having been lifted off.

Our invention consists in making the molds of plaster-of-paris or other equivalent plastic material, confined within protecting metallic rings or cases.

In the drawings, A is the lower mold, and B is the upper mold.

C is the plaster-of-paris portion of each mold, and D is the metal ring.

The rings D D are circular in plan, so as to best resist a bursting-strain, and should be made thinnest at their abutting edges and gradually thicker toward their opposite edges.

The plaster-of-paris portions C C of the two molds are formed in the usual way, with a cavity between them, in which to mold the clay for the dish.

The molds shown are designed to produce a dish which is square in plan, with rounded corners, as shown in Fig. 3, where the dish E, which has been formed, is shown in place on the lower mold. Around the portion of the mold on which the dish is shaped is a concentric conical shoulder, a, formed by a circular depression in the lower mold and a corresponding projection on the upper one, whereby the exact centering of the two molds is insured.

In the lower mold are four (more or less) conical depressions, b b, and in the upper one are four corresponding projections, which fit together, respectively, and insure that the two molds shall come together in the proper position.

The clay is placed on the lower mold, and the upper mold is placed over it. They are then placed in a powerful press and submitted to heavy pressure, which molds the article at once. The protecting-rings D D serve to withstand the pressure and re-enforce the plaster portions of the molds, so that the latter will not be broken by the pressure, which is so great that it would rupture plaster molds made in the ordinary way.

The molds will be adapted in their shape and the way of fitting together to the shape and character of the article to be formed.

When necessary, more than two molds or parts may be used, and the separate molds or parts will fit together in any manner best adapted to removing the molded article, according to methods well known in the art.

We are aware that it has been proposed to manufacture earthenware knobs by molding them in metal molds lined with plaster-of-paris; but we do not consider this identical with our invention, nor are we aware that the idea has ever been practiced or rendered practicable.

We claim as our invention—

1. The improved molds for the manufacture of pottery-ware, consisting of the combination of two or more metal rings or cases and two or more molds of plastic material confined in said rings or cases, and each formed with the impression of one side of the dish to be molded, substantially as set forth, whereby the molds are adapted to resist the heavy pressure applied to them.

2. The combination of two metal rings or cases, D D, and two molds, C C, of plastic material, confined within said rings, respectively, the lower mold formed with a depression, within which rises a projection conforming to the concave side of the dish to be molded, and the upper mold formed with a corresponding projection having within it a recess conforming to the convex side of the dish to be molded, substantially as set forth.

3. The combination, to form a mold for molding dishes of other than circular form, of two metal rings and two plastic molds confined therein, formed, respectively, with impressions of the opposite sides of the dish to be molded, and one formed with inclined projections and the other with correspondingly-arranged inclined sockets, to guide the two parts into position, substantially as set forth.

In witness whereof we have hereunto signed our names in the presence of two subscribing witnesses.

JAMES MADDOCK.
JOHN FRANCIS MADDOCK.

Witnesses:
JOHN HUGHES,
ROBERT S. T. ELEY.